(12) United States Patent
Kadota

(10) Patent No.: US 8,565,989 B2
(45) Date of Patent: Oct. 22, 2013

(54) METHOD OF ADJUSTING CHARACTERISTICS OF A CLUTCH IN A HYBRID ELECTRIC VEHICLE

(75) Inventor: Keiji Kadota, Chiba (JP)

(73) Assignees: Hyundai Motor Japan R&D Center, Inc., Yokohama (JP); Hyundai Motor Company, Seoul (KR); Kia Motors Corporation, Seoul (KR)

( * ) Notice: Subject to any disclaimer, the term of this patent is extended or adjusted under 35 U.S.C. 154(b) by 481 days.

(21) Appl. No.: 12/575,979

(22) Filed: Oct. 8, 2009

(65) Prior Publication Data

US 2010/0114442 A1    May 6, 2010

(30) Foreign Application Priority Data

Oct. 31, 2008  (KR) .................. 10-2008-0107791

(51) Int. Cl.
*G06F 17/00* (2006.01)
*B60K 1/00* (2006.01)
(52) U.S. Cl.
USPC ............................................. 701/67; 180/292
(58) Field of Classification Search
USPC ................... 701/22, 35, 208, 213, 211, 300; 180/65.1, 65.21, 65.8; 340/995.1–995.19
See application file for complete search history.

(56) References Cited

U.S. PATENT DOCUMENTS

| 2001/0049576 A1* | 12/2001 | Wheeler et al. ............... 701/67 |
| 2003/0060951 A1* | 3/2003 | Mayer et al. .................. 701/29 |
| 2004/0188218 A1* | 9/2004 | Berger et al. ................. 192/90 |
| 2005/0006953 A1* | 1/2005 | Versteyhe et al. ........... 303/191 |
| 2008/0058154 A1* | 3/2008 | Ashizawa et al. .............. 477/5 |

FOREIGN PATENT DOCUMENTS

| JP | 2000-130203 A | 5/2000 |
| JP | 2000-136835 A | 5/2000 |
| KR | 10-2005-0096104 | 10/2005 |
| KR | 10-2007-0095825 | 10/2007 |

* cited by examiner

*Primary Examiner* — Muhammad Shafi
(74) *Attorney, Agent, or Firm* — Edwards Wildman Palmer LLP; Peter F. Corless

(57) ABSTRACT

A method of adjusting the characteristics of a clutch in a hybrid electric vehicle, more particularly to a method of adjusting characteristic of a clutch for a hybrid electric vehicle, which is capable of maintaining the characteristic of the clutch at an appropriate level while suppressing the frequency of the adjustment as possible, thereby a driver or passengers of the vehicle hardly feel annoyance caused by frequent adjustment of characteristic of a clutch.

8 Claims, 8 Drawing Sheets

METHOD OF ADJUSTING CHARACTERISTICS OF A CLUTCH IN A HYBRID ELECTRIC VEHICLE

CROSS-REFERENCE TO RELATED APPLICATION

This application claims under 35 U.S.C. §119(a) the benefit of Korean Patent Application No. 10-2008-0107791 filed on Oct. 31, 2008, the entire contents of which are incorporated herein by reference.

BACKGROUND (a) Technical Field

The present invention relates to a method of adjusting the characteristics of a clutch in a hybrid electric vehicle, which is capable of maintaining the characteristics of the clutch at an appropriate level while reducing the frequency of the adjustment of the clutch characteristics, thereby resolving annoyance a driver or passengers may feel when the adjustment is frequently made.

(b) Background Art

A hybrid vehicle basically refers to a vehicle that uses two or more power sources to propel the vehicle in a fuel-efficient manner. Mostly, the term 'hybrid vehicle' is used for denoting a hybrid electric vehicle (HEV) that includes an internal combustion engine powered by fuel and an electric motor powered by a battery.

The hybrid vehicle is driven by using electric energy from the battery and mechanical energy from the engine. In the hybrid vehicle, both the electric motor and the engine may be operated optimally and regenerative braking may be employed as well. Accordingly, high energy efficiency can be achieved.

FIG. 1 schematically illustrates a powertrain (drivetrain) of a parallel hybrid vehicle. The parallel hybrid vehicle comprises an engine 10 as a power source, a motor-generator (MG) 20, a clutch 12 situated between the engine 10 and the motor-generator 20, and an automatic transmission 30 to which the output end of the motor-generator 20 is coupled.

The parallel hybrid vehicle is driven in three driving modes: HEV mode, EG mode and EV mode. In HEV mode, both the engine 10 and the motor-generator 20 are used in combination to propel the vehicle. In EG mode, only power from the engine is used. In EV mode, only power from the motor-generator 20 is used. The driving mode can be selected according to operation (engagement/disengagement) of the clutch 12, which is controlled by, e.g., a hydraulic device. Namely, the clutch 12 is engaged (closed) in EG mode and HEV mode while it is disengaged (opened) in EV mode.

In practical, during low speed driving or at starting of the vehicle, the motor-generator 20, which exhibits maximum torque at low RPM, is used to drive the vehicle When the vehicle enters into steady speed cruising state, the engine 10 is started by means of an integrated starter/generator (ISG) 40 so that the outputs from the engine 10 and the motor-generator 20 can be utilized in a combined manner. The outputs from the engine 10 and the motor-generator 20 are transmitted to the automatic transmission 30, which then provides desired rotation speed to driven wheels through a drive shaft 50.

More specifically, during low speed driving or at starting of the vehicle, the clutch 12 is disengaged and the motor-generator 20 thus becomes a sole power source to drive the vehicle. Since engine torque is minimal at low RPM while motor-generator torque is maximal at low RPM, fuel efficiency can be improved by using the motor-generator 20 to complement the torque of the engine 10 at low RPM.

When a driving mode is changed from EV mode to EG or HEV mode, i.e. as the clutch 12 become engaged, awkward clutch engagement may often occur with undesirable shock if clutch control is performed without considering the characteristics of the clutch 12 such as thrust against a clutch disc, slip rate, torque transmission, relationship between temperature and kinds of oil.

Japanese Patent No. 3657902 discloses a method for controlling the operation of a clutch in a hybrid vehicle by feedback control. The method, however, involves undesirable vibration occurring during clutch engagement. Further, Japanese Patent No. 3657902 discloses a method of learning and adjusting the characteristics of a clutch when clutch slip is available such as in the event of vehicle deceleration. The adjustment, however, is still insufficient.

On the other hand, Korean Patent Application No. 10-2007-0128676 filed by the present inventors discloses a method of adjusting the characteristics of a clutch in a hybrid vehicle, which comprises: idle-rotating the engine by transmitting power from the motor-generator with the clutch in half-clutch state in a state where an output to the transmission is blocked and the engine is in a fuel-cut state; estimating a clutch transmitting torque based on the torque of the motor-generator when rotating speeds of the engine and the motor-generator become constant; and adjusting the characteristics of the clutch based on the estimated clutch transmitting torque. This method, still, can be applied only when the transmission is in neutral (non operation) state. For this reason, it is hard to perform such adjustment frequently.

The above information disclosed in this Background section is only for enhancement of understanding of the background of the invention and therefore it may contain information that does not form the prior art that is already known in this country to a person of ordinary skill in the art.

SUMMARY

In a preferred embodiment, the present invention provides a method of adjusting characteristic data of a clutch for a hybrid electric vehicle. The hybrid electric vehicle may include: a motor-generator, a rotational speed detecting means thereof, a suitable control means thereof, and an estimating means for output torque thereof; an engine, a rotation speed detecting means thereof, and a control means thereof; a clutch interposed between the motor-generator and the engine, and a clutch control means for controlling the clutch such that power transmission between the engine and the motor-generator is suitably controlled; a transmission for transmitting, blocking or converting power from the motor-generator and/or the engine to driven wheels, and a control means thereof; an estimating means for clutch transmitting torque; and a plurality of characteristic maps of clutch transmitting torque for control. The method may comprise steps of: estimating a clutch transmitting torque by a first clutch transmitting torque estimating logic when ignition is ON, after confirming a vehicle is in a state of braking and the transmission is configured to transmit power from an input to the driven wheels; checking an error between the clutch transmitting torque estimated by the first clutch transmitting torque estimating logic and clutch characteristic data obtained from the characteristic maps of clutch transmitting torque for control; terminating further procedures in case where the error is within a predetermined range; estimating a clutch transmitting torque by a second clutch transmitting torque estimating logic in case where the error exceeds the predetermined range, the second clutch transmitting torque estimating logic being configured to estimate a clutch transmitting torque based on torque of the motor-generator; and adjusting the clutch characteristic data in accordance with the clutch transmitting torque estimated by the second clutch transmitting torque estimating logic.

Suitably, the first clutch transmitting torque estimating logic may estimate an engine friction torque as a clutch transmitting torque when a rotation speed of the engine becomes constant, i.e. after synchronization of the engine friction torque and the clutch transmitting torque.

Suitably, the clutch characteristic data may be a predicted clutch transmitting torque that is read out from the characteristic maps of clutch transmitting torque for control in accordance with a clutch control pressure and difference of rotation between the engine and the motor-generator at time of the estimation of clutch transmitting torque.

Preferably, the clutch transmitting torque estimated by the second clutch transmitting torque estimating logic my be identical with the torque of the motor-generator, whereby the clutch characteristic data is adjusted based on the torque of the motor-generator.

Preferably, the step of adjusting the clutch characteristic data may comprise selecting one as a control map from the pre-registered plurality of characteristic maps of clutch transmitting torque, based on the clutch transmitting torque estimated by the second clutch transmitting torque estimating logic and difference in rotation between the engine and the motor-generator at time of the estimation of clutch transmitting torque.

Preferably, a characteristic map that has the closest torque to the clutch transmitting torque at difference of rotation between the engine and the motor-generator may be selected as the control map.

Suitably, the method may further comprise steps of: repeating estimation of a clutch transmitting torque by the first clutch transmitting torque estimating logic and check of an error between the estimated clutch transmitting torque and clutch characteristic data whenever ignition is ON; and determining abnormality of the clutch characteristic data if a number of errors exceeding the predetermined range reaches a threshold value within predetermined times.

Suitably, The method may further comprise steps of: repeating estimation of a clutch transmitting torque by the first clutch transmitting torque estimating logic and check of an error between the estimated clutch transmitting torque and clutch characteristic data whenever ignition is ON; adjusting the clutch characteristic data in accordance with the clutch transmitting torque estimated by the second clutch transmitting torque estimating logic in case where a number of errors being within the predetermined range reaches a threshold value; estimating a clutch transmitting torque by the first clutch transmitting torque estimating logic; checking an error between the estimated clutch transmitting torque and clutch characteristic data; and determining abnormality of error checking procedure itself or the clutch if the error exceeds the predetermined range.

Other aspects and features of the invention are discussed in detail infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircrafts, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present invention will be described in detail with reference to certain exemplary embodiments thereof illustrated by the accompanying drawings which are given hereinafter by way of illustration only, and thus are not limitative of the present invention, and wherein.

Figure 1:
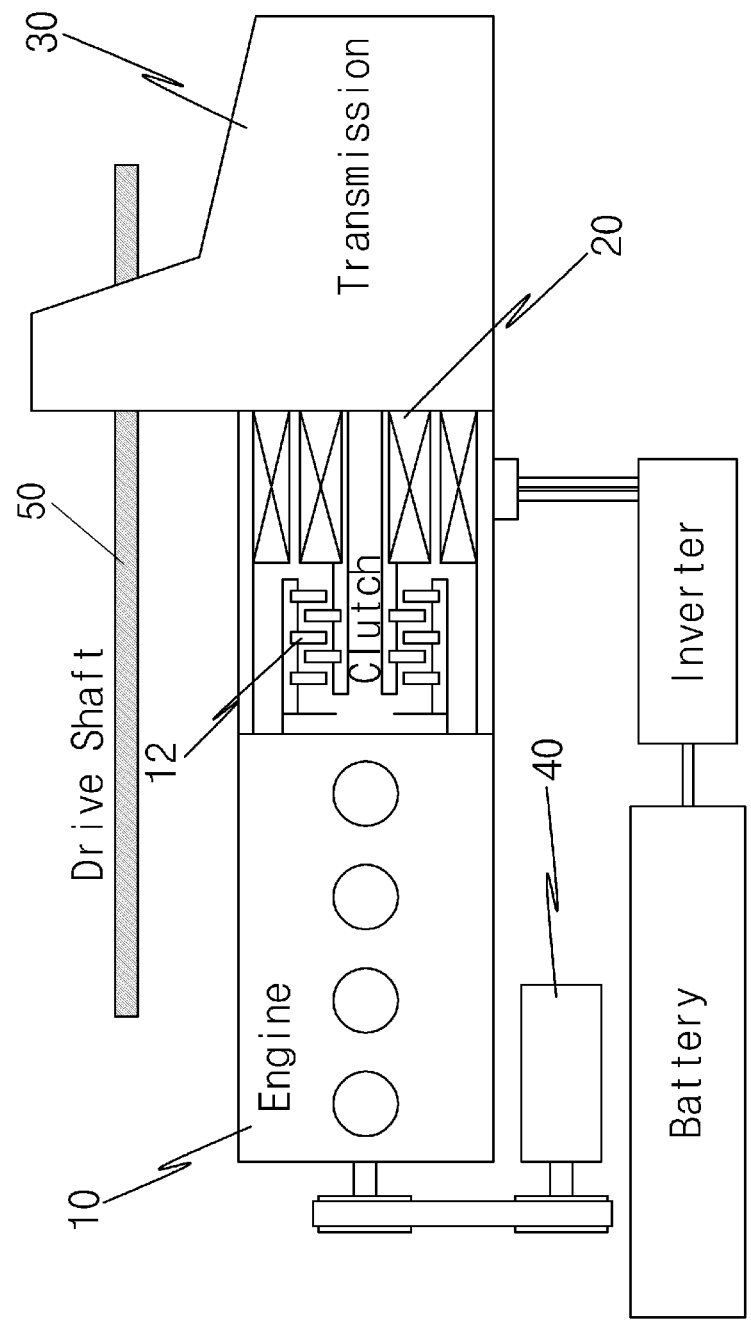
FIG. 1 schematically illustrates a drive system and a powertrain (drivetrain) of a parallel hybrid vehicle.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to embodiments of the present invention, examples of which are illustrated in the drawings attached hereinafter, wherein like reference numerals refer to like elements throughout. The embodiments are described below so as to explain the present invention by referring to the figures.

The present invention provides a method of adjusting the characteristics of a clutch in a hybrid electric vehicle, which is capable of maintaining the characteristics of the clutch at an appropriate level while reducing the frequency of the adjustment.

In an embodiment of the present invention, a powertrain (drivetrain) of a hybrid vehicle comprises: a motor-generator, a rotational speed detecting means thereof, a control means thereof, and an estimating means for output torque thereof; an engine, a rotation speed detecting means thereof, and a control means thereof; a clutch interposed between the motor-generator and the engine, and a clutch control means for controlling the clutch such that power transmission between the engine and the motor-generator is suitably controlled; a transmission for transmitting, blocking or converting power from the motor-generator and/or the engine to driven wheels, and a control means thereof; an estimating means for clutch transmitting torque; and a plurality of characteristic maps of clutch transmitting torque for control.

Figure 2:
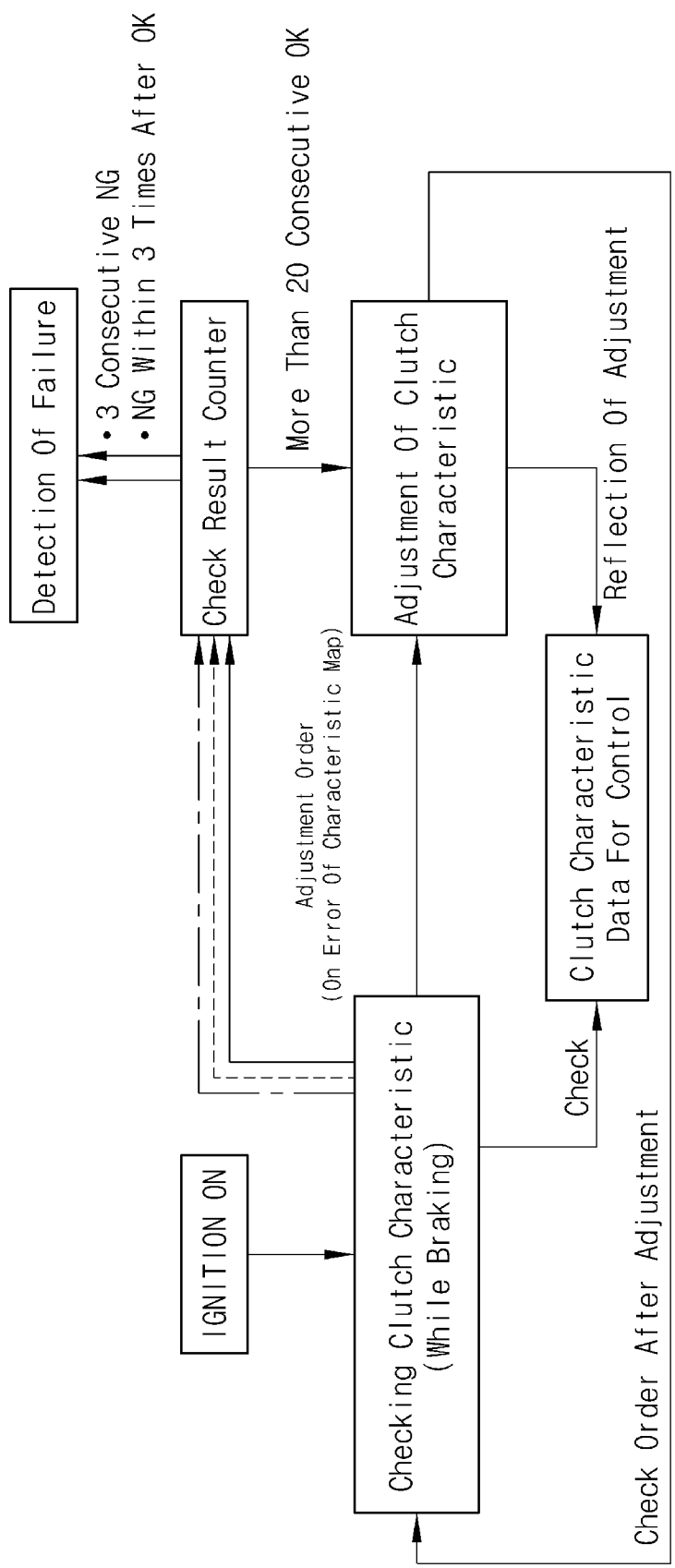
FIG. 2 is a schematic diagram showing a method of adjusting the characteristics of a clutch in a hybrid electric vehicle according to an embodiment of the present invention.

Referring to FIG. 2, according to a method of according to an embodiment of the present invention, in step a, every time the vehicle is driven (e.g., ignition ON), the characteristics of a clutch of a vehicle are determined at the deceleration of the vehicle the by a method that is applicable to a vehicle in deceleration state.

In step b, an error is then determined by comparing the determined characteristics of the clutch with a clutch characteristics data for control.

In step c, if the determined error is within a predetermined range (i.e., OK state), the determined characteristics of the clutch are used as data for generating control signal; on the other hand, if the determined error is out of the predetermined range, the characteristics of the clutch are estimated by a method as detailed below and on the basis of the estimated characteristics of the clutch, the clutch characteristics data for control is renewed and utilized as data for generating control signal.

In step d, if the error still is out of the predetermined range even after repeating the steps a and b (i.e. NG state), the step c is repeated. During the repetition, if a predetermined number (e.g. 10 or 20) or higher of the NG state is consecutively detected, a warning for deterioration of the characteristics of the clutch is issued.

In step e, if a predetermined number (e.g. 10 or 20) or higher of the OK state is detected consecutively, the steps c and d are forcibly performed to self-diagnose whether the steps a, b, and c are properly performed.

Hereinafter, the method of adjusting the characteristics data of a clutch in a hybrid vehicle will be described in detail.

1) Normal Control Procedure

When a vehicle is in ignition ON state, a first clutch transmitting torque estimating logic checks whether the transmission is in D-range and the vehicle is decelerating. If it is determined that the transmission is in D-range and the vehicle is decelerating, the first clutch transmitting torque estimating logic checks an error by comparing the estimated clutch characteristics in the step a with a clutch characteristics data for control. If the error lies within a predetermined range, no further procedure is performed.

Figure 3:
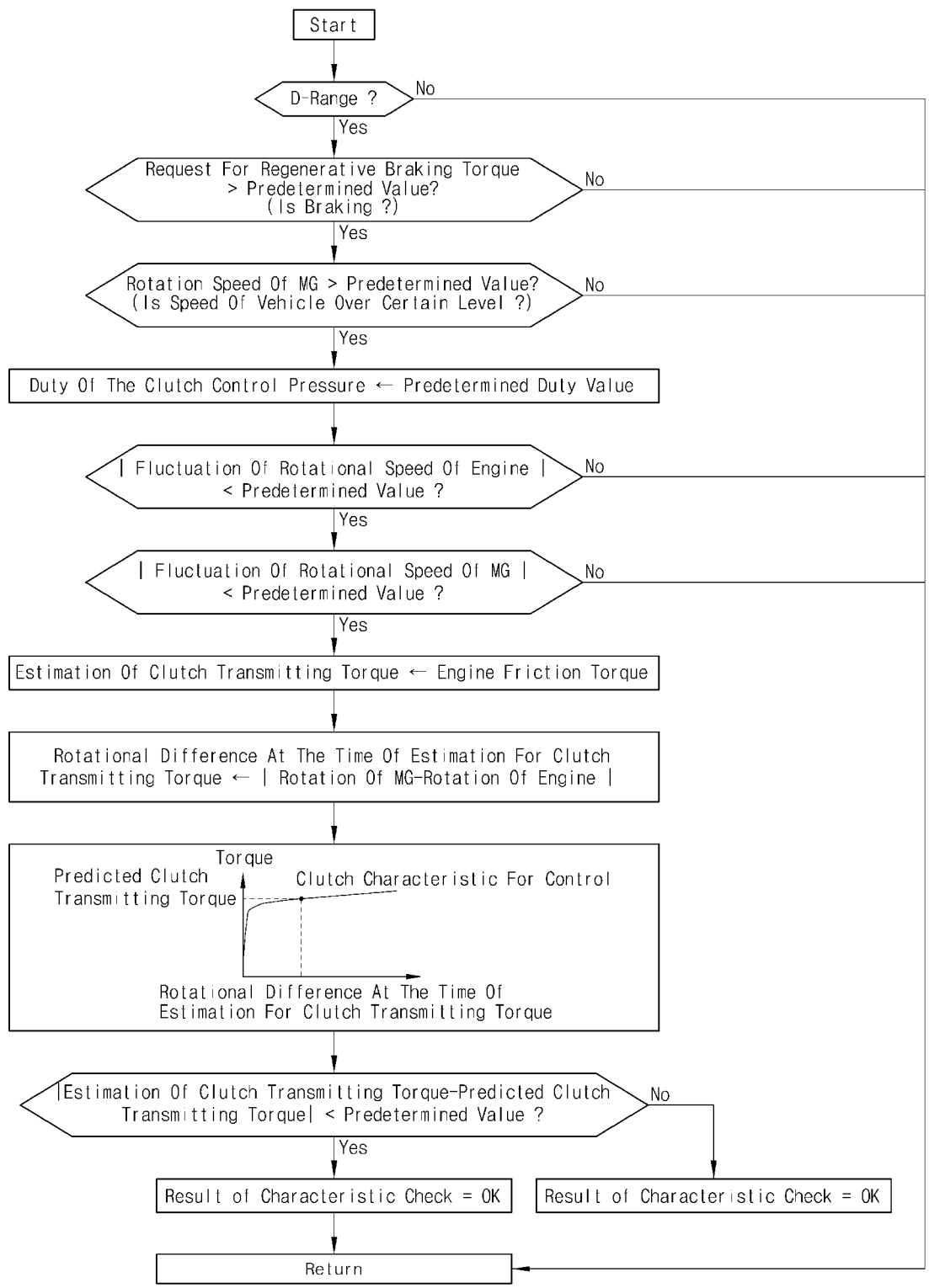
FIG. 3 is a flow chart showing a process of estimating a clutch transmitting torque by a first clutch transmitting torque estimating logic and checking an error by comparing the estimated clutch transmitting torque with a clutch characteristic data for control according to an embodiment of the present invention.
Figure 4:
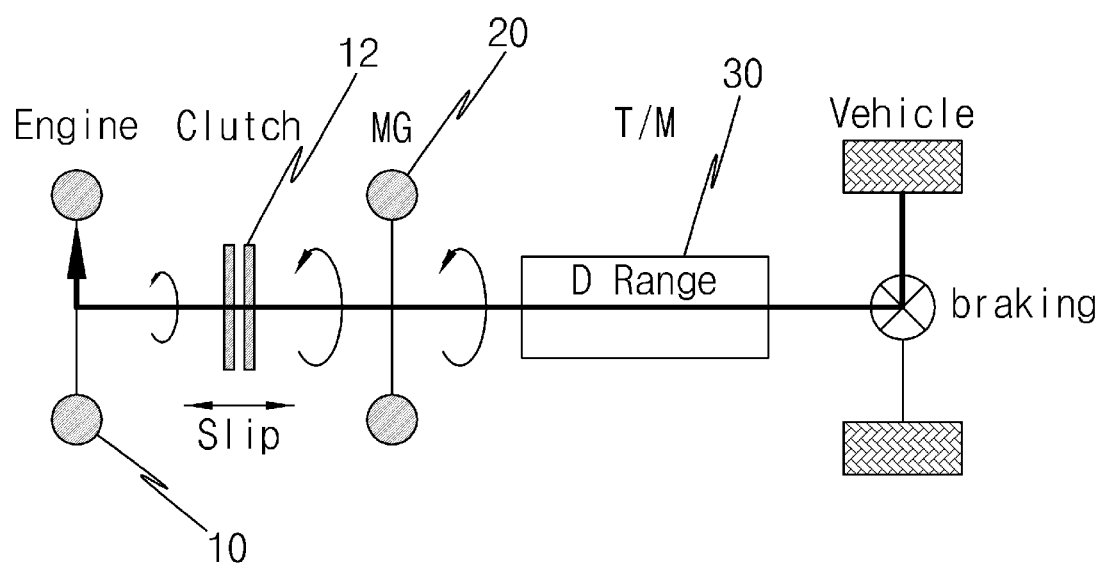
FIG. 4 is a schematic diagram showing an operation of a hybrid powertrain when a clutch transmitting torque is estimated by a first clutch transmitting torque estimating logic according to an embodiment of the present invention.

With reference to FIGS. 3 and 4, the above-mentioned error checking process is explained in detail.

When a vehicle is decelerating with the transmission in D-range, control pressure of the clutch is increased and rotation of the wheels is transferred to the engine. At this time, the engine, in a fuel-cut state, absorbs a clutch transmitting torque by engine friction.

The rotation speed of the engine becomes constant as the clutch transmitting torque and the engine friction torque are synchronized with each other. The engine friction torque at this time point of synchronization is deemed as an estimated clutch transmitting torque. Based on the estimated clutch transmitting torque, clutch characteristics data for control is checked.

The clutch characteristics data for control is checked by comparing the estimated clutch transmitting torque with a predicted clutch transmitting torque, The predicted clutch transmitting torque is read out from a characteristics map of clutch transmitting torque for control, based on a clutch control pressure and a difference between the engine rotation speed and the motor-generator rotation speed at the time point of the synchronization.

If |the estimated clutch transmitting torque—the predicted clutch transmitting torque| is lower than a predetermined value (i.e., OK state), no further procedure is performed. The predetermined value is suitably obtained in advance from empirical data of an actual vehicle test. On the other hand, if |the estimated clutch transmitting torque—the predicted clutch transmitting torque| is the same as or higher than the predetermined value (i.e., NG state), a second clutch transmitting torque estimating logic is executed.

The second clutch transmitting torque estimating logic serves to estimate a clutch transmitting torque. Based on the estimated clutch transmitting torque, adjustment of the clutch characteristics data for control is performed. Such adjustment of the clutch characteristics data for control is performed by a method as described below.

Figure 5:
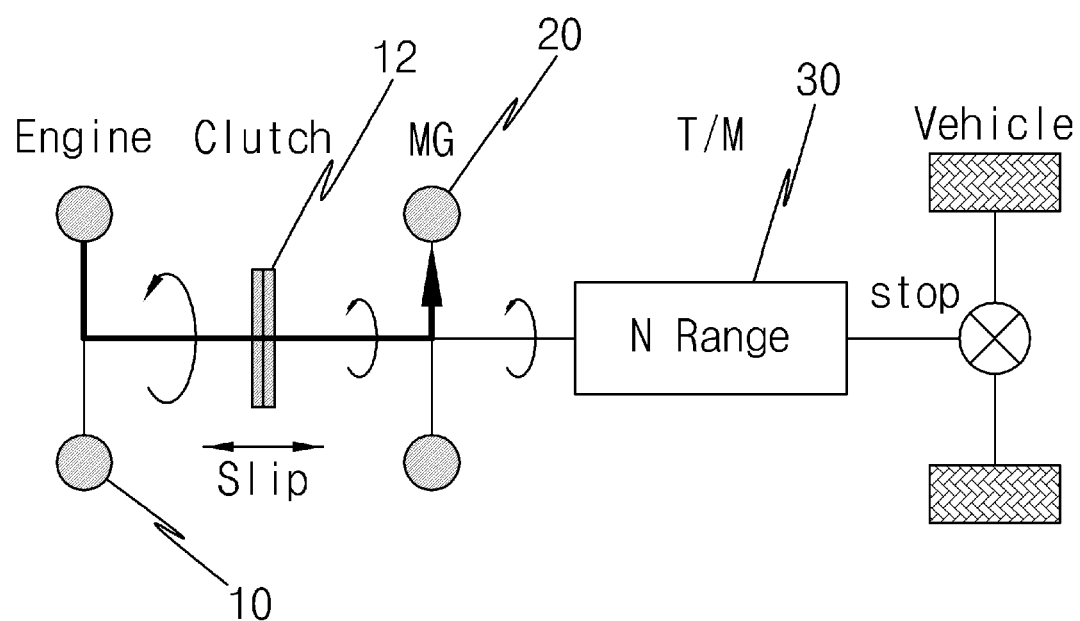
FIG. 5 is a schematic diagram showing an operation of a powertrain when a clutch transmitting torque is estimated by a second clutch transmitting torque estimating logic according to an embodiment of the present invention.
Figure 6:
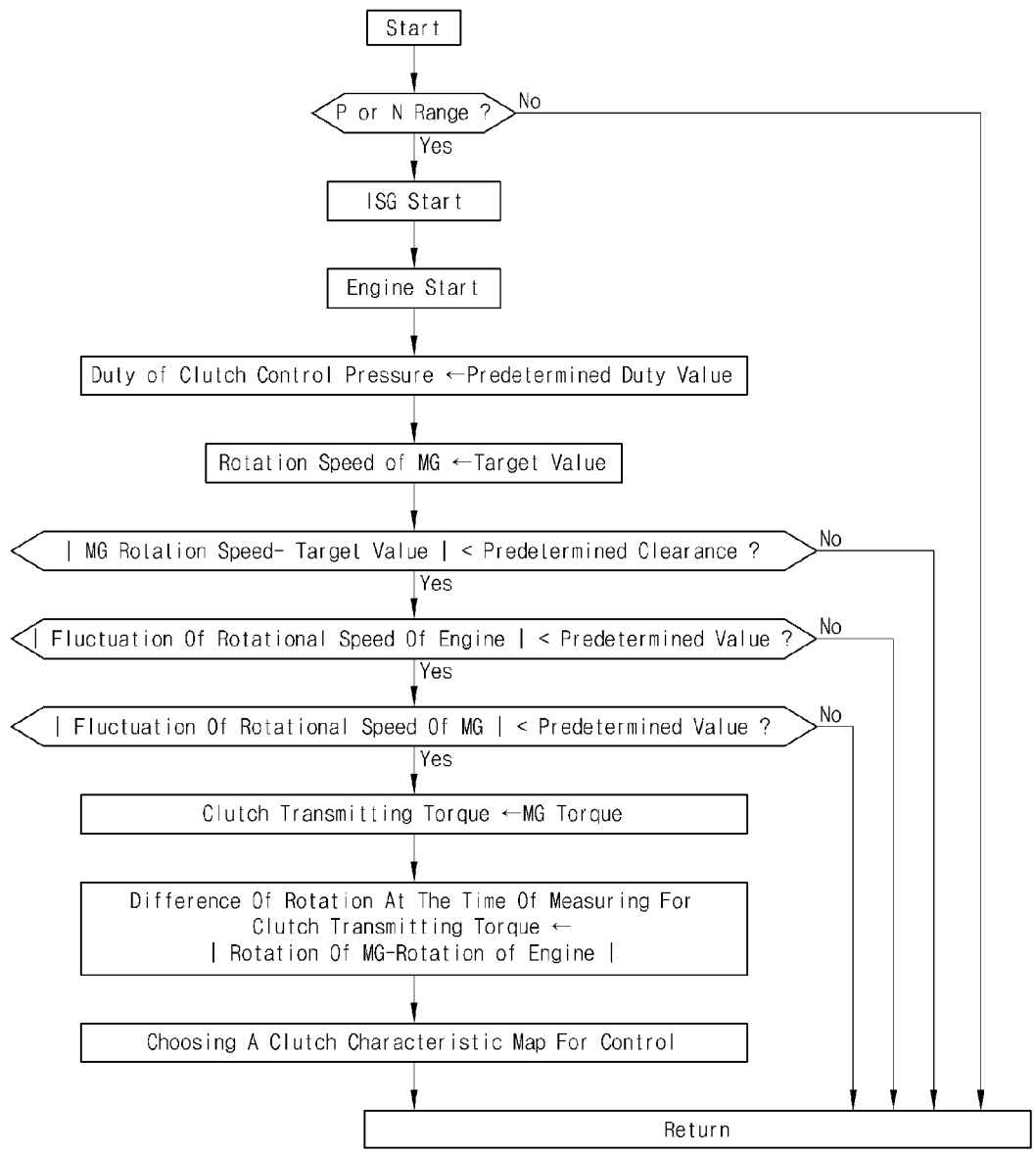
FIG. 6 is a flow chart showing a process of estimating a clutch transmitting torque by a second clutch transmitting torque estimating logic and adjusting the clutch characteristics data according to an embodiment of the present invention.

With reference to FIGS. 5 and 6, with the transmission 30 in P or N range, the motor-generator 20 is rotated by means of power transferred from the engine 10 through the clutch 12 in half-clutch state. It is determined by the second clutch transmitting torque estimating logic whether the rotation speeds of the engine 10 and the motor-generator 20 become stable (i.e., steady state). The motor-generator torque at the steady state is estimated as a clutch transmitting torque. The clutch characteristics are adjusted based on the estimated clutch transmitting torque.

More specifically, with the transmission 30 set to non-driving state, an ISG 40 starts the engine 10. The torque generated by the engine 10 is transmitted to rotate the motor-generator 20 via the clutch 12 in half-clutch state.

The motor-generator 20 is controlled in such a manner that the rotation speed thereof becomes constant by absorbing the engine torque. The rotations of the engine and the motor-generator become steady when the engine output torque, the clutch transmitting torque, and the motor-generator torque are synchronized together. The motor-generator torque at the steady state is deemed as an estimated clutch transmitting torque. From a plurality of candidate characteristics maps of clutch transmitting torque for control, a map closest to the slip rotation (rotation rate) corresponding to the estimated clutch transmitting torque is selected.

More particularly, as shown in FIG. 6, the duty of the clutch control pressure is set by a predetermined duty value and the rotation speed of the motor-generator is set by a predetermined target rotation speed. Whether a difference between the (real) rotation speed of the motor-generator and the predetermined target rotation speed lies in a allowable clearance; whether fluctuation of the rotation speed of the engine lies in a allowable clearance; and whether fluctuation of the rotation speed of the motor-generator lies in a allowable clearance are determined. If it is determined that the difference and fluctuations are within respective clearances, rotation speeds of the engine and motor-generator become steady. The torque of the motor-generator at the steady state is estimated as a clutch transmitting torque. Based on the estimated clutch transmitting torque, the characteristics of the clutch are adjusted.

The clutch characteristics adjustment may be made by using a control map selected from a plurality of candidate characteristics maps on the basis of the estimated clutch transmitting torque and a difference between the rotation speeds of the engine and the motor-generator corresponding to the estimated clutch transmitting torque. Also, the clutch characteristics adjustment may be made by using a map selected from a plurality of candidate characteristics maps on the basis of real clutch transmitting torque measured and a difference between the rotation speeds of the engine and the motor-generator corresponding to the measured real clutch transmitting torque.

Figure 7:
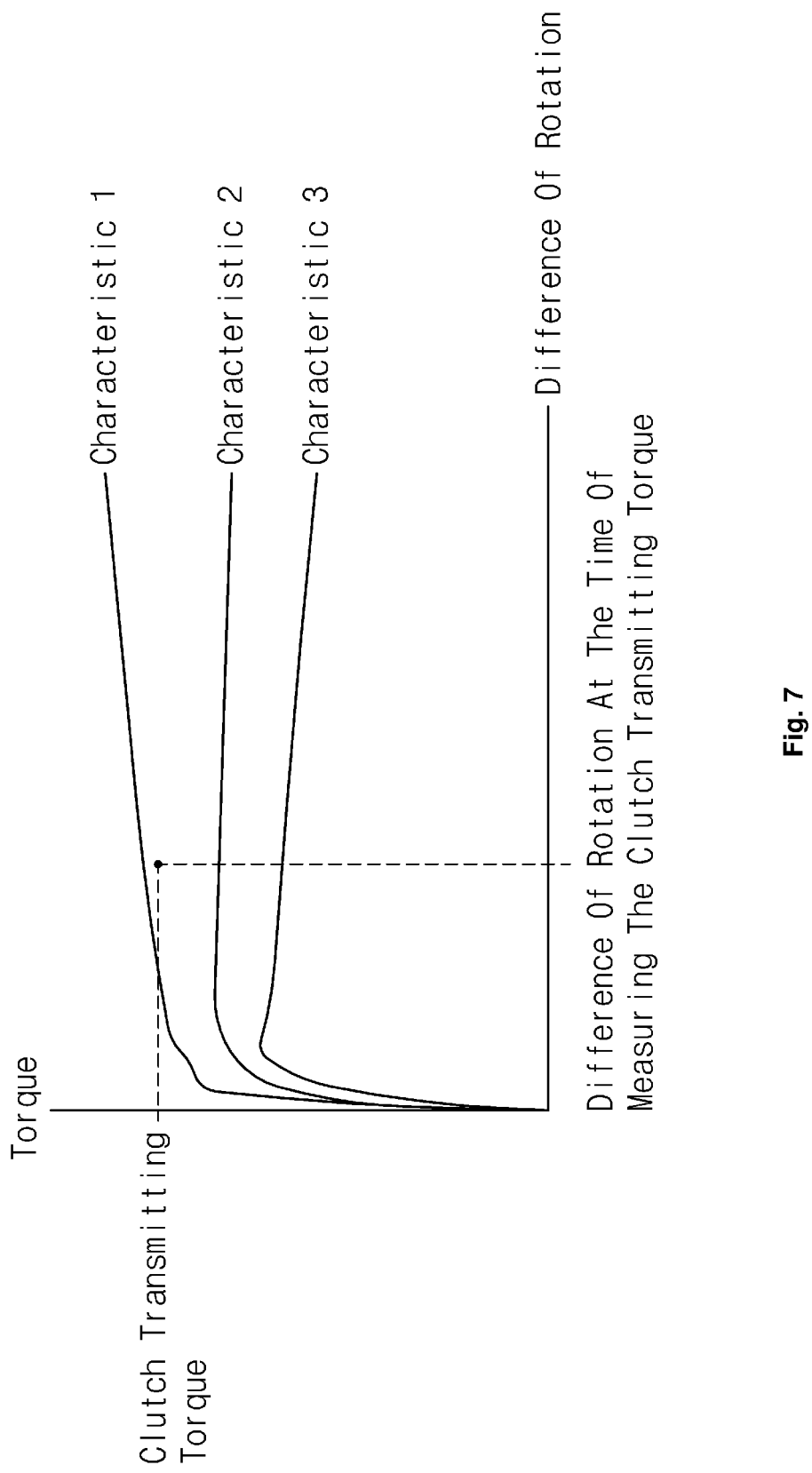
FIG. 7 is a graph illustrating a plurality of pre-registered characteristics maps from a control map is selected based on an estimated clutch transmitting torque.

FIG. 7 illustrates a plurality of pre-registered characteristics maps from which a control map is selected based on the real clutch transmitting torque. As shown in the figure, the map 1 that has a torque closest to a real clutch transmitting torque is selected as a control map.

Upon completion of the adjustment for the characteristics data of the clutch for control by the second clutch transmitting torque estimating logic, an error check for the characteristics data of the clutch for control is performed again by the first clutch transmitting torque estimating logic. If the error lies within a predetermined range, no further procedure is performed. Otherwise, adjustment for the characteristics data of the clutch by the second clutch transmitting torque estimating logic is repeated and such an error check is repeated. Upon the error check, if the error is within the predetermined range, no further procedure is performed. On the other hand, if the error is still out of the predetermined range, it is determined that the error checking logic(s) or the clutch itself is out of order and the characteristics data of the clutch for control is then replaced with a characteristics data of the clutch for fail (emergency).

2) Detection for Abnormality of the Characteristics Data of the Clutch

As described in the foregoing procedure 1), the first clutch transmitting torque estimating logic checks an error of a clutch characteristics data for control, and if the error lies within a predetermined range, the procedure 1) is terminated. Here, termination of the procedure 1) also occurs when the error lies within the predetermined range in further error checks done after adjustment of the characteristics data of the clutch by the second clutch transmitting torque estimating logic.

The error check is performed repeatedly whenever ignition is ON. If the error is detected to be out of the predetermined range for a predetermined number of times (e.g., 3 times), it is determined that the characteristics data of the clutch does not accord with normal variation of a typical characteristics data of the clutch (i.e. in abnormal state), and then the characteristics data is replaced with a characteristics data for a failure situation. Suitably, the predetermined number is obtained from empirical data of a actual vehicle test.

3) Detection for Abnormality of Error Checking

As described in the foregoing procedure of 1), the first clutch transmitting torque estimating logic checks an error of a clutch characteristic data for control, and if the error lies within a predetermined range, the procedure 1) is terminated. Here, termination of the procedure 1) also occurs when the error lies within the predetermined range in further error checks done after adjustment for the characteristic data of the clutch by the second clutch transmitting torque estimating logic.

The error check is performed repeatedly whenever ignition is ON. If the error is detected to be within a predetermined range for at least a predetermined number of times (e.g., 20 times) consecutively, the characteristics data of the clutch is adjusted using the second clutch transmitting torque estimating logic.

Subsequently, the first clutch transmitting torque estimating logic checks an error of the adjusted clutch characteristics data for control, and if the error lies within a predetermined range, no further procedure is performed. On the other hand, if the error is out of the predetermined range, it is determined that the error checking logic(s) itself is out of order and the characteristics data is replaced with a characteristic data for a failure situation.

According to the aforementioned methods, the characteristics of a clutch in a hybrid vehicle can be adjusted accurately (approximately, 95% of accuracy) and less frequently (e.g., every 5000 km), thereby decreasing the feeling of incongruity. Also, the clutch characteristics estimation or clutch itself can be monitored so as to immediately detect failure thereof.

Figure 8:
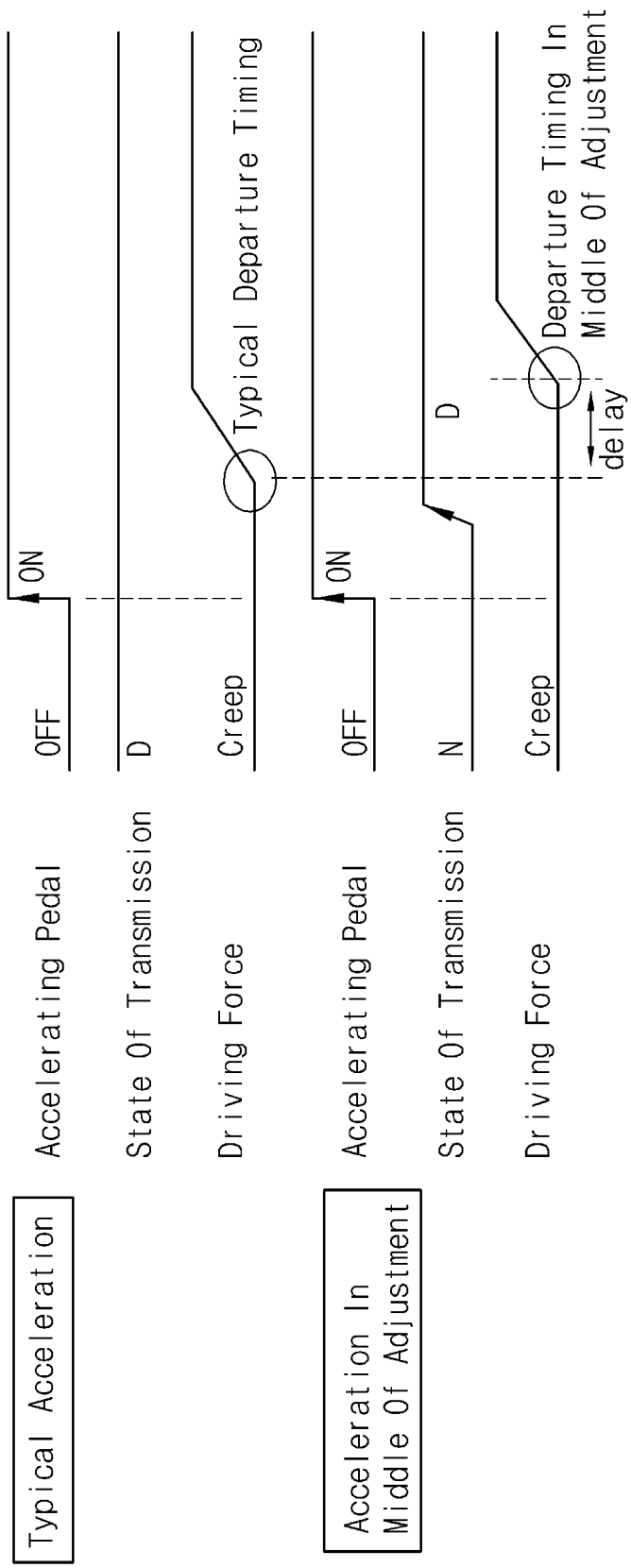
FIG. 8 is a graph illustrating a time-lag in accelerating a vehicle leading to feeling of incongruity.

Here, the feeling of incongruity indicates time-lag in accelerating. As shown in FIG. 8, when a driver steps on an accelerating pedal, the estimation procedure is ceased and the transmission is shifted from N range to D range in response to the driver's order.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of adjusting characteristic data of a clutch for a hybrid electric vehicle, the method comprising:
   estimating a clutch transmitting torque by a first clutch transmitting torque estimating logic embedded in a clutch control means, when ignition is ON, after confirming a vehicle is in a state of braking and a transmission is configured to transmit power from an input to driven wheels;
   checking an error between the clutch transmitting torque estimated by the first clutch transmitting torque estimating logic embedded in the clutch control means, and clutch characteristic data obtained from characteristic maps of clutch transmitting torque for control;
   terminating further procedures in case where the error is within a predetermined range;
   estimating a clutch transmitting torque by a second clutch transmitting torque estimating logic embedded in the clutch control means in case where the error exceeds the predetermined range, the second clutch transmitting torque estimating logic embedded in the clutch control means being configured to estimate a clutch transmitting torque based on torque of a motor-generator; and
   adjusting the clutch characteristic data in accordance with the clutch transmitting torque estimated by the second clutch transmitting torque estimating logic embedded in the clutch control means, wherein adjusting the characteristic data further includes:
      idle rotating an engine by transmitting power from the motor-generator with the clutch in a half-clutch state where an output to the transmission is blocked and the engine is in a fuel cut state;
      estimating a clutch transmitting torque based on the torque of the motor generator when rotating speeds of the engine and the motor-generator becomes constant; and
      adjusting the characteristics of the clutch based on the estimated clutch transmitting torque.

2. The method according to claim 1, wherein the first clutch transmitting torque estimating logic estimates an engine friction torque as a clutch transmitting torque when a rotational speed of the engine becomes constant, wherein after synchronization of the engine friction torque and the clutch transmitting torque.

3. The method according to claim 1, wherein the clutch characteristic data is a predicted clutch transmitting torque that is read out from the characteristic maps of clutch transmitting torque for control in accordance with a clutch control pressure and difference of rotation between the engine and the motor-generator at time of the estimation of clutch transmitting torque.

4. The method according to claim 1, wherein the clutch transmitting torque estimated by the second clutch transmitting torque estimating logic is identical with the torque of the motor-generator, whereby the clutch characteristic data is adjusted based on the torque of the motor-generator.

5. The method according to claim 1, wherein adjusting the clutch characteristic data further comprises selecting at least one control map from the pre-registered plurality of characteristic maps of clutch transmitting torque, based on the clutch transmitting torque estimated by the second clutch transmitting torque estimating logic and difference of rotation between the engine and the motor-generator at time of the estimation of clutch transmitting torque.

6. The method according to claim 5, wherein during the selection of the control map, a characteristic map that has the closest torque to the clutch transmitting torque at difference of rotation between the engine and the motor-generator, is selected as the control map.

7. The method according to claim 1, further comprising steps of: repeating estimation of a clutch transmitting torque by the first clutch transmitting torque estimating logic and check of an error between the estimated clutch transmitting torque and clutch characteristic data whenever ignition is ON; and determining abnormality of the clutch characteristic data if a number of errors exceeding the predetermined range reaches a threshold value within predetermined times.

8. The method according to claim 1, further comprising steps of: repeating estimation of a clutch transmitting torque by the first clutch transmitting torque estimating logic and check of an error between the estimated clutch transmitting torque and clutch characteristic data whenever ignition is ON; adjusting the clutch characteristic data in accordance with the clutch transmitting torque estimated by the second clutch transmitting torque estimating logic in case where a number of errors being within the predetermined range reaches a threshold value; estimating a clutch transmitting torque by the first clutch transmitting torque estimating logic; checking an error between the estimated clutch transmitting torque and clutch characteristic data; and determining abnormality of error checking procedure itself or the clutch if the error exceeds the predetermined range.

\* \* \* \* \*